Feb. 14, 1939.  G. A. DOTY ET AL  2,147,247
BARREL WASHING APPARATUS
Filed March 31, 1937   6 Sheets-Sheet 1

INVENTORS
George A. Doty and
Samuel F. Kimball
BY Spear Rawlings & Spear.
ATTORNEYS.

Feb. 14, 1939.　　　　G. A. DOTY ET AL　　　　2,147,247

BARREL WASHING APPARATUS

Filed March 31, 1937　　　　6 Sheets-Sheet 5

INVENTORS
George A. Doty and
Samuel F. Kimball
BY Spear Rawlings & Spear.
ATTORNEYS Patented Feb. 14, 1939

2,147,247

UNITED STATES PATENT OFFICE 2,147,247

BARREL WASHING APPARATUS

George A. Doty and Samuel F. Kimball, Portland, Maine, assignors to The Portland Company, Portland, Maine, a corporation of Maine Application March 31, 1937, Serial No. 134,053

24 Claims. (Cl. 141—6)

Our present invention relates to apparatus for cleansing barrels.

Prior to reuse, such barrels as those used for petroleum products are repainted after their exteriors and interiors have been thoroughly cleansed and dried. The difficulty and expense of manually cleansing such barrels have resulted in several attempts heretofore to furnish equipment which will permit the reconditioning of the barrels with efficiency and economy.

The major problems involved arise in connection with the cleansing of the interiors of the barrels as the bungholes or filler openings through which the cleansing injections are delivered to the interior of the barrels prevent thorough drainage and drying of the interiors. Bungholes or filler openings, whether located in the sides or in the ends of the barrels, are so formed and positioned that the fluids can not entirely drain out, thus requiring the use of auxiliary means to exhaust the undrained fluid from the barrels which are generally positioned so as to establish fluid collecting pockets in some portion of the barrel interiors.

Heretofore fluid has been exhausted from the fluid collecting pocket after the barrel has been washed by a manually inserted exhaust member which extended into the pocket. It has also been proposed to withdraw the collected fluid from the pocket without removing the barrel from over the fluid delivery nozzle. Real difficulty however has been experienced with this proposed solution since the fluid collecting pocket is positioned laterally of the bunghole and the position of the bunghole relative to the chime varies in different barrels.

In accordance with our invention, we rotatably support a barrel in canted position so as to have its axis of rotation defined by its bunghole or filler opening and the lowest port of the barrel which presents the internal fluid collecting pocket. The barrel is received by a rotatable support which engages the barrel in canted position after a delivery spindle has been inserted into the barrel through the bunghole and the barrel tilted to bring the delivery spindle into alignment with the axis of rotation of the rotatable support, in which position the spindle is locked.

The spindle includes an exhaust passage which enters the fluid collecting pocket and in which passage suction is created by the fluid or air being delivered to the spindle through a conduit flexibly connected to separate air and fluid pipes.

We recondition the outsides of the barrels by spray heads positioned to discharge fluids aganst all the exterior surfaces of the barrel so that as it rotates the barrel is thoroughly washed, inside and out, and its interior is thoroughly dried.

In the accompanying drawings, we have illustrated an embodiment of our invention in which ten barrels are progressively under treatment. The capacity of each embodiment and many details of construction and operation will of course depend in part on the number of barrels to be cleaned. It is also dependent on the speed with which barrels may be removed and replaced by the operator.

Throughout the drawings and specification like reference numerals are employed to designate corresponding parts, and in the drawings.

We have shown at 1 a circular housing having a roof 2, a vent 3 and a door D through which the barrels B may be loaded and unloaded on to the carrier C.

Figures 13, 14:
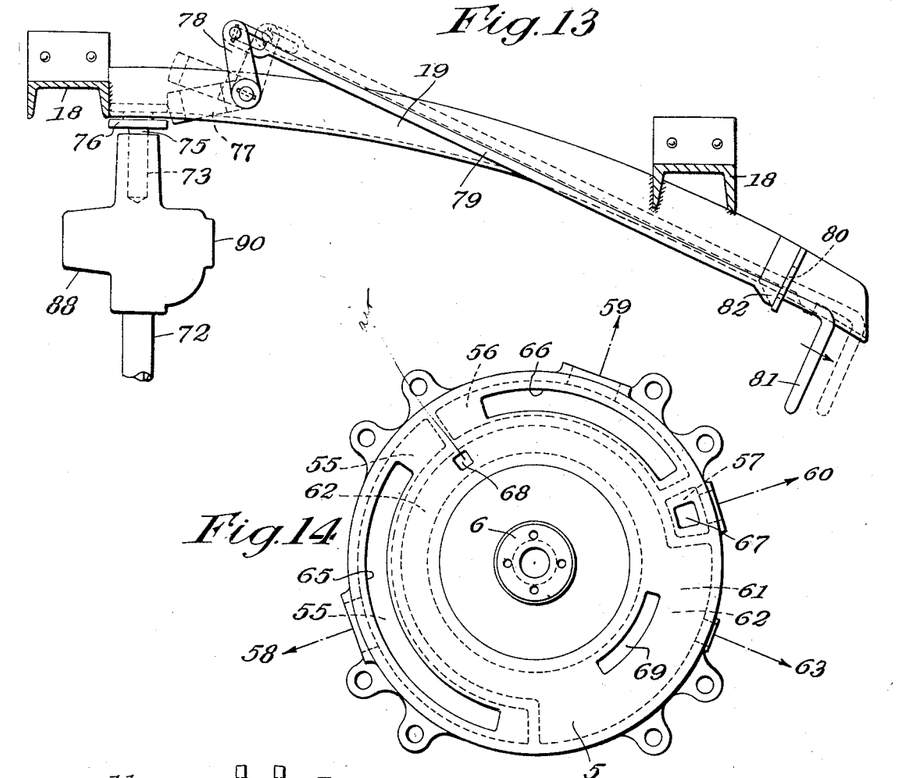
Fig. 13 is an enlarged view of the details of the means locking the spindle in position in a barrel.
Fig. 14 shows the stationary valve member in plan view.
Figure 15:
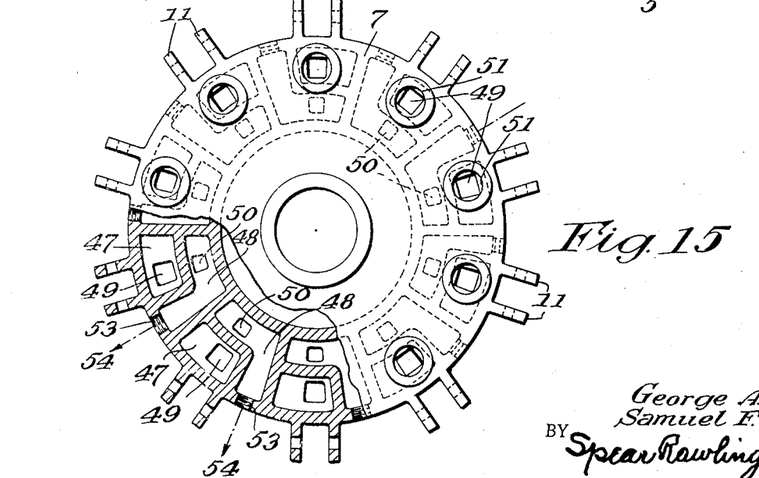
Fig. 15 is a similar plan view of the rotating valve member.

Centrally of the housing 1 we position a table 4 supporting the valve A which comprises the fixed valve member 5, which includes an axial hub 6, and the rotatable valve member 7. The valve member 7 is formed to fit over the hub 6 and is held against the valve member 5 by the spring 8 compressibly held by the spring washers 9 secured to the hub 6.

The rotatable barrel carrier

Figure 1:
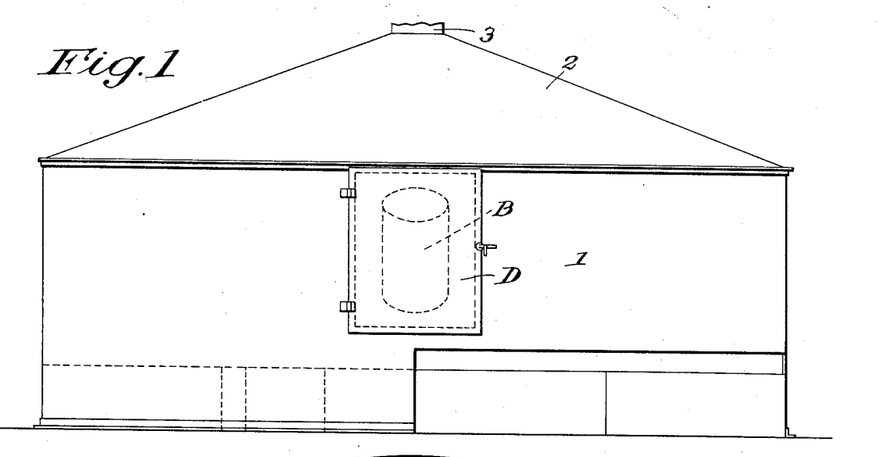
Fig. 1 is a front elevation of our apparatus.
Figure 2:
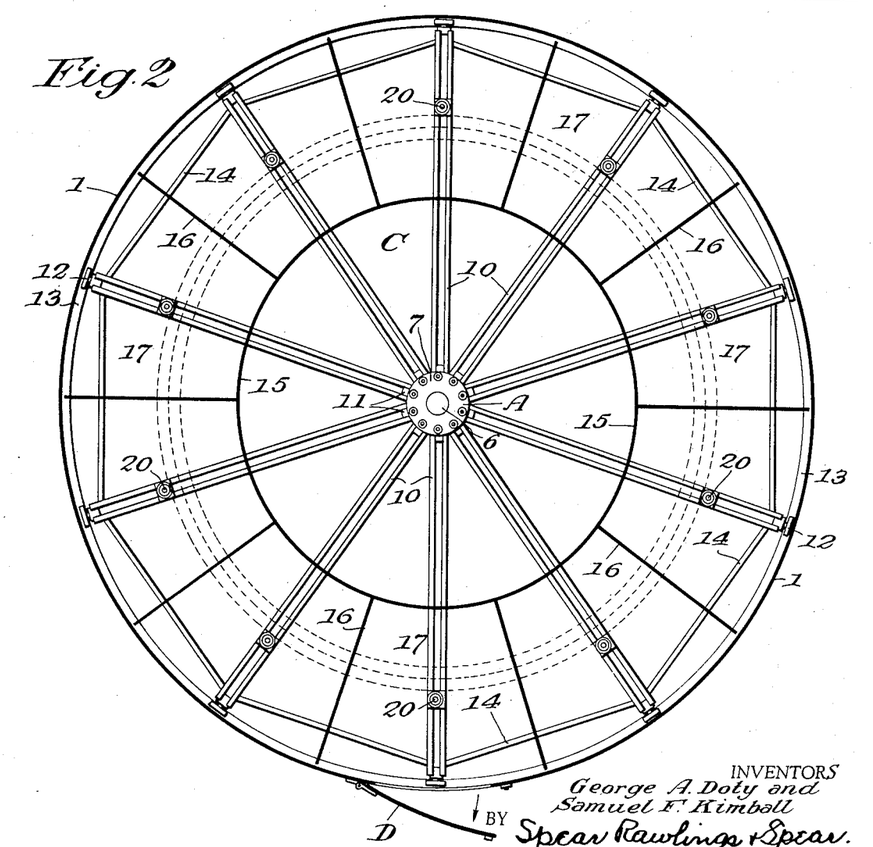
Fig. 2 is a plan view showing the general construction of the rotatable carrier.

The rotatable barrel carrier, generally referred to and indicated by C, comprises a plurality of pairs of radially disposed beams 10 which are connected to pairs of ears 11 on the rotatable valve member 7. Each pair of radial beams includes at its outer end a roller 12 adapted to travel on the supporting track 13 secured to the inner surface of the housing 1.

The pairs of beams 10 are interconnected adjacent their outer ends by braces 14. The beams 10 support a circular inner wall 15 to which are secured radially disposed walls 16 supported by the braces 14 and defining a plurality of compartments 17, centrally of each of which extends a pair of the beams 10. A pair of members 18 interconnect the walls 16 in the upper part of each compartment 17. These members 18 support flanged members establishing a track 19 extending from the outer edge of each compartment 17 inwardly in alignment with the pair of beams 18.

A shaft 20 is rotatably supported between each pair of beams 10. On this shaft 20 is pivotally mounted a rotatable V-shaped barrel support 21. A collar 22 is slidably splined to the lower end of the shaft 20, which collar 22 includes clutch surfaces 22a adapted to interengage with the like surfaces 23a of a gear 23 loosely mounted on the shaft 20 (see Figs. 5 and 6).

Figures 5, 6:
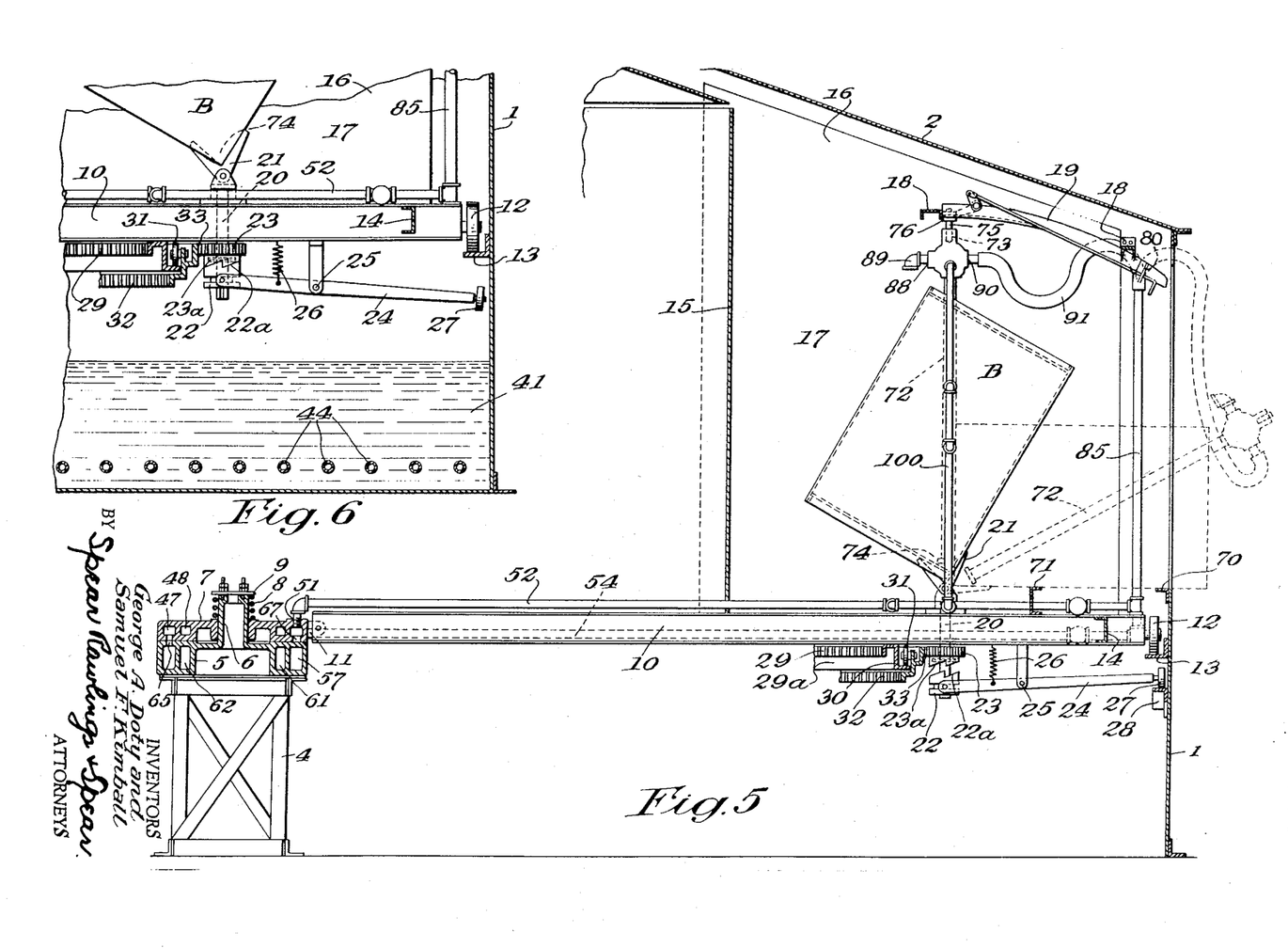
Fig. 5 is a fragmentary view showing one compartment and a barrel held therein with the means for rotating the barrel support disengaged from its rotating means.
Fig. 6 is an enlarged fragmentary view showing the rotating means operatively connected to the barrel support.
Figure 7:
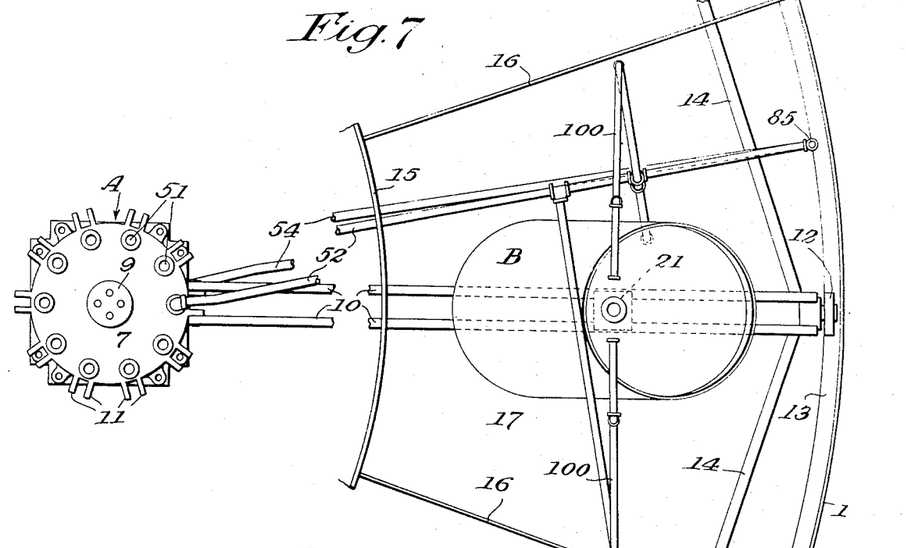
Fig. 7 is a fragmentary plan view of the fluid delivery system including the rotating valve and a barrel compartment.
Figure 8:
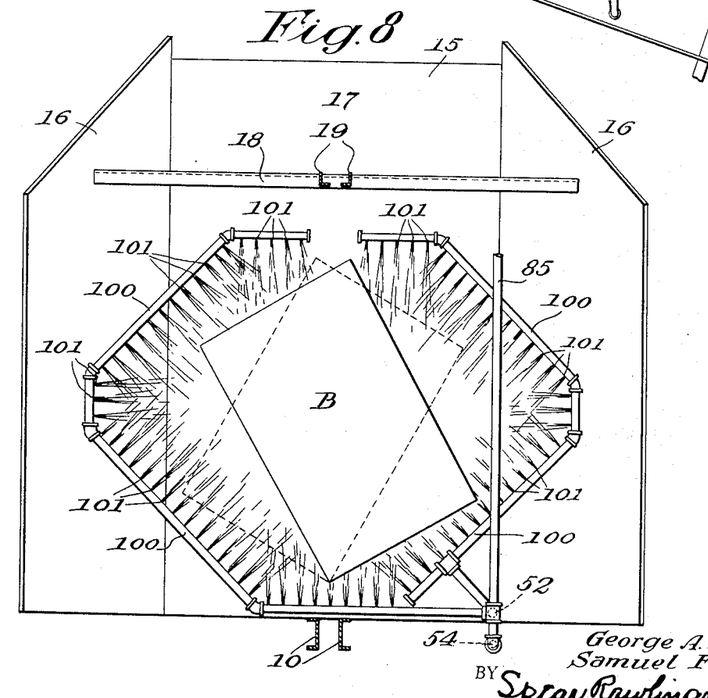
Fig. 8 is a front elevation of one compartment showing the fluid delivery means.

The collar 22 is grooved to receive the forked end of a lever 24 which is fulcrumed at 25 and normally positioned by a spring 26 to effect clutch engagement. The other end of the lever 24 is provided with a roller 27 adapted to be actuated by contact with a cam 28 mounted on the inner surface of the casing 1 to disengage the clutch surfaces 22a and 23a when a compartment 17 is adjacent the door D.

An internally toothed rim gear 29 is secured to the lower surfaces of the beams 10 and includes a depending portion 29a having a laterally and outwardly disposed flange 30 which serves as a track for wheel members 31 supporting a second internally toothed rim gear 32. The gear 32 includes an externally toothed gear portion 33 in mesh with the gears 23.

We have indicated at 34 a motor having a driving pinion 35 in mesh with the rim gear 29 by which the carrier C is rotated, and at 36 a motor having a driving pinion 37 in mesh with the second rim gear 32 by which the V-shaped barrel rotating supports 21 are rotated.

By the use of the construction just described, we are able to rotate the V-shaped barrel supports 21 independently of rotation of the carrier C. The rotation of each may be controlled as desired. Rotation of the supports 21 is stopped adjacent the loading door D by the contact of the levers 24 with the cam 28, and rotation of the carrier C may be interrupted when a compartment 17 is adjacent the door D for a sufficient length of time to permit loading and unloading of the barrel from its support 21. This may be accomplished by suitable electrically controlled means, not shown, which of course will vary according to the extent of automatic control desired in different embodiments and uses of our invention.

The means delivering the cleansing mediums to the barrel compartments

Figure 3:
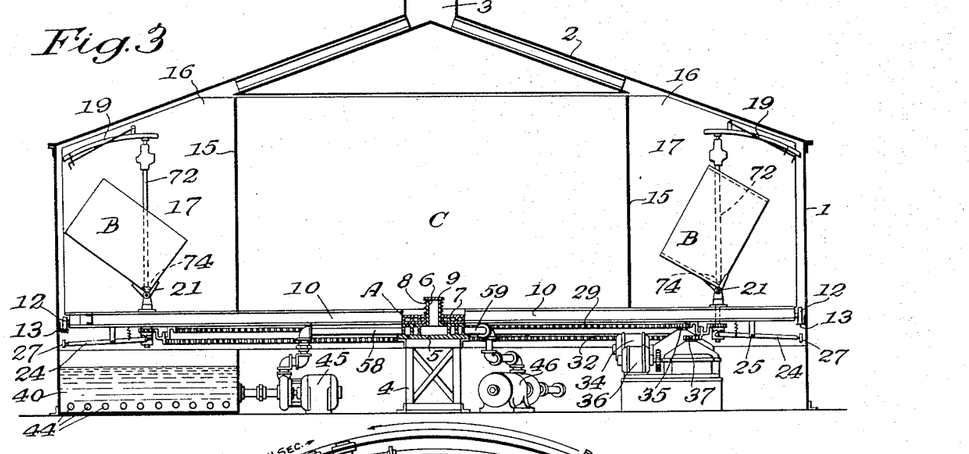
Fig. 3 is a section through our apparatus.

Within the housing 1 and below the rotatable carrier C are positioned arcuate tanks 40 and 41, the tank 40 containing the washing solution, and the tank 41 the rinsing solution. The compartments 17 are formed without flooring and a fluid is delivered by the valve A to a compartment 17 as it travels over the tank for that fluid so that the fluid may return to its tank of source after use. For that reason the tanks are of a length to permit at a predetermined rate of rotation of the support C a sufficient delivery of fluid to wash or rinse the barrels thoroughly before the compartment 17 is carried beyond the tank for the fluid being delivered.

Each tank is provided with heating means 44 and is provided with delivery pumps 45 and 46 for the washing and rinsing fluids respectively.

As above pointed out, the valve A comprises the fixed valve member 5 and the rotatable valve member 7. The rotatable valve member 7 is provided with a plurality of pairs of chambers 47 and 48 having radially aligned inlet ports 49 and 50 respectively. The chambers 47 have outlets 51 in substantial radial alignment with the ears 11 from which outlets 51 pipes 52 extend to each of the compartments 17. The chambers 48 have outlet ports 53 laterally of the ears to which ports 53 are connected pipes 54 extending into the compartments 17. From the pipes 52 and 54 the fluids and air are conducted to the barrel washing means in each compartment 17 as will be later described.

The fixed valve member 5 is provided with arcuate chambers 55, 56 and 57, the chamber 55 being connected to the washing fluid pump 45 by the pipe 58, the chamber 56 being connected to the rinsing fluid pump 46 by the pipe 59, and the chamber 57 being connected to a source of unused fresh water, not shown, by the pipe 60. A chamber 61 comprising a circular portion 62 inwardly of the chambers 55, 56 and 57, is connected to a source of air under pressure, not shown, by the conduit 63. The chambers 55, 56 and 57 are provided with outlet ports 65, 66 and 67 disposed to register with the inlet ports 49 of the valve member 7 as the valve member 7 rotates. The chamber 61 is provided with an outlet port 68 and its circular portion 62 is provided with an outlet port 69, the outlet ports 68, 69 being disposed to register with the inlets 50 of the valve member 7 as the valve member 7 rotates.

The valve just described delivers fluids to the compartments 17 as they rotate in the following order: While a compartment 17 is over the washing fluid tank 40, washing fluid and air are delivered to that compartment successively. The arcuate outlet port 65 of the valve member 5 is of sufficient length to deliver washing fluid through the now-aligned inlet port 49 of the valve member 67 through the chamber 47 to the fluid pipe 52 to wash the barrel thoroughly, while the outlet port 69 for the air chamber 62 registers with the inlet port 50 of the chamber 48 to deliver air through the pipe 54 to exhaust any washing fluid collected in the interior of the barrel, as will be later described, before the compartment 17 passes from over the tank 40.

Further rotation of the carrier C positions the inlet port 49 in registry with the arcuate outlet port 66 of the rinsing fluid chamber 56, the compartment 17 now being over the rinsing fluid tank 41. After the barrel has been rinsed for a sufficient length of time, the inlet port 49 moves to a position in registry with the outlet port 67 for the freshwater rinse, while still over the tank 41.

After the compartment 17 has passed from over the tank 41, the port 5 moves into registry with the arcuate air outlet port 68 to thoroughly dry the barrel before it reaches the door D.

*Barrel cleansing means*

The barrel cleansing means may be most readily understood by considering the loading of a barrel B into a compartment 17 of our apparatus through the door D. It may be assumed that the carrier C is now stationary and the clutch members 22a and 23a in control of the shaft 20 are disengaged as shown in Fig. 5.

Barrels such as those employed for petroleum products either have bungholes or filler openings in their ends adjacent the chimes or in their sides. Wherever we have used the word "bunghole" it will be understood that we means an aperture in either the ends or sides of containers. The former type of barrel is manually positioned on its side and supported by the V-shaped rotatable support 21 and the door sill 70, while barrels of the latter type are manually positioned with one of their ends supported by the V-shaped support 21 and the fixed support 71, shown in Fig. 5, which is carried by the carrier C within the door D. Both types of barrels are positioned so that the bungholes are accessible to the operator.

The operator inserts into a barrel of either type through its bunghole a combined fluid delivery and exhaust spindle 72, later to be described, and which is guided into alignment with the axis of rotation of the support 21 by tilting the barrel inwardly. At this point, the V-shaped support is positioned as shown in dotted lines in Fig. 5, and the barrel is initially so positioned in the V-shaped support 21 with a portion of its chime within the V-shaped support, that when the barrel is tilted with the support in upright position, the barrel lies in such a canted position as to define a chime-to-bunghole axis of rotation for the barrel which is established by the bunghole and the lowest interior point of the barrel which lowest point establishes the fluid collecting pocket 74. In Fig. 3, barrels of both types are shown as finally positioned in our device.

We provide in each of the compartments 17 means for rotating the spindle 72 in alignment with the axis of rotation of the V-shaped support 21. These means include a track 19 which is radially in alignment with the pairs of beams 10, and curves outwardly and downwardly, presenting an arc having its center substantially at the base of the V-shaped support 21.

The spindle 72 is of sufficient length to enter the lowest point or pocket 74 of a barrel canted as above described, and includes at its upper end a recess 73 which receives the pin 75 of the flanged member 76 which is manually positioned in and guided by the track 19. After the operator has inserted the spindle 72 into the barrel B through its bunghole, the flanged member 76 and the spindle 72 are slidably united by inserting the pin 75 in the recess 73. The barrel B is then tilted to permit the flanged member 76 to be positioned in the track 19, and the barrel is further tilted until the spindle 72 and the flanged member 76 are in alignment with the axis of rotation of the V-shaped support 21, the arc-shape of the track 19 cooperating to prevent the spindle 72 and the flanged member 76 from becoming disengaged while the barrel is being tilted. It will be appreciated that variations in barrel construction including the location of bungholes will result in the fluid collecting pocket 74 lying in different horizontal planes. Due to the sliding interconnection of the spindle 72 and the flanged member 76, the spindle 72 may be shortened or extended relative to the flanged member 76 to accommodate itself by gravity to bear against the surfaces defining the particular collecting pocket 74 within the barrel.

We have provided means to lock the flanged member 76 in place in the desired axis of rotation. (See Fig. 13.) Fixed means such as one of the members 18 prevents the flanged member 76 from moving too far inwardly. At 77 we have shown a dog adapted to hold the flanged member 76 from moving outwardly along the track 19. The dog 77 is pivotally connected to a dog lever 78 on the outside of the track 19. The dog lever 78 is operable by the arm 79 which has a slotted interconnection therewith to permit the dog 77 to fall in place by gravity and to be raised by the member 76 as it moves inwardly. The arm 79 passes through a slotted guide 80 carried on the outside of the track 19. The arm 79 includes a handle 81 which the operator may conveniently reach through the door D. The arm 79 carries a block 82 bearing against the guide 80 to prevent accidental movement of the dog 77. The operator raises the arm 79 to permit the block 82 to pass through the slot of the guide 80 when he desires to move the dog 77 from its position holding the flanged member 76 in alignment with the axis of rotation of the rotatable support 21.

The fluid supply pipes 52 and the air supply pipe 54 both communicate with a vertically disposed pipe 85 located near the front of the chamber 17 laterally of the path of the barrels when positioned in or removed from our apparatus.

The spindle 72 includes a pair of concentric passages 86 and 87 (see Figs. 9 to 12), the inner passage 87 being in communication with a suction chamber 88 having a downturned exhaust 89 disposed to discharge fluid on or against the exterior of the rotating barrel, and the outer passage 86 and the chamber 88 are in communication with an inlet 90. This inlet 90 is connected to the upright pipe section 85 by a flexible hose 91, of sufficient length to permit the spindle 72 to be manually inserted into the barrels and the barrels tilted into or out of the supporting means above described.

The outer passage 86 is provided with a plurality of jets 92, some of which are disposed at an angle of less than ninety degrees, while others are disposed at an angle of substantially ninety degrees to the passage 86 to ensure the direction of the cleansing fluid against all surfaces of the interior of the barrel as it rotates.

Figures 9, 10, 11, 12:
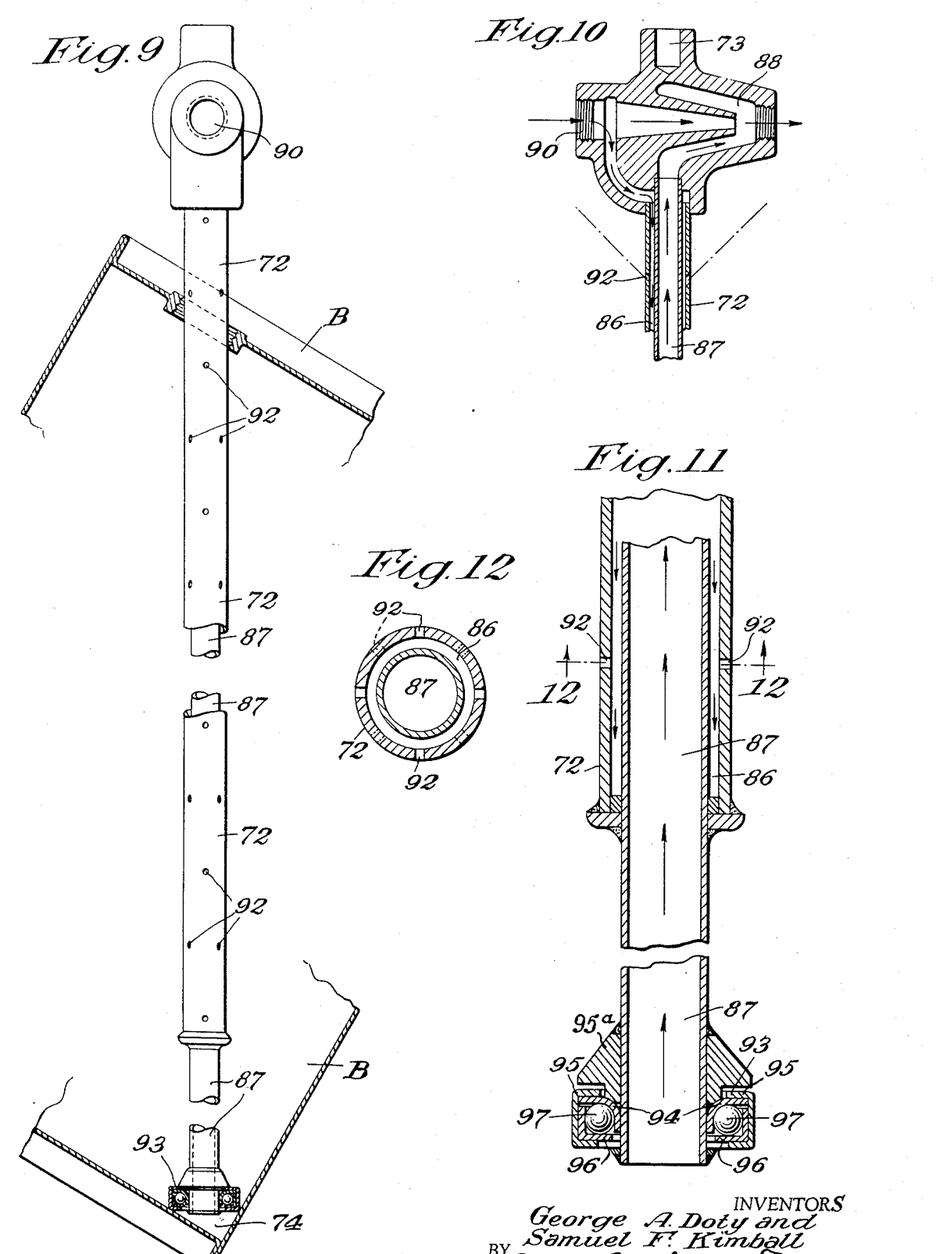
Fig. 9 is an enlarged view of the delivery and exhaust spindle in place in a barrel.
Fig. 10 is a fragmentary section of the spindle showing the head in detail.
Fig. 11 is an enlarged view in cross section of the lower end of the spindle.
Fig. 12 is a section on the line 12—12 of Fig. 11.

The inner passage 87 extends into the pocket 74 and is provided with a rotatable bearing 93 to contact the adjacent surfaces of the barrel defining the pocket 74. The details of the bearing 93 are shown in Fig. 11. A flange 94 is secured adjacent the end of the wall defining the exhaust passage 87. The flange 94 supports the U-shaped ring 95 in which is positioned the circular flange member 96 between which and the flange 94 are positioned a plurality of ball bearings 97. The bearing 93 is protected against injury from contact with the edge of the container aperture by the guard 95a carried by the conduit 87.

The means for cleansing the outside of the barrels

In our apparatus the exteriors of the barrels are washed and rinsed simultaneously with the washing and rinsing of their interiors. To effect this, we provide in each compartment 17 a pair of opposed substantially C-shaped pipe sections or spray heads 100 connected to the fluid delivery pipe 52. The pipe sections 100 are positioned to define a plane inclusive of the axis of rotation of a supported barrel, and includes a plurality of spray jets 101 which direct fluid against all surfaces of the exteriors of the barrels as they rotate. The C-shaped spray heads, as may be seen in the drawings, permit the rotation of any barrel supported on a chime-to-bunghole axis of rotation.

The operation of the apparatus

After a barrel B has been positioned in a compartment 17, the rotation of the carrier C is started. As soon as the roller 27 is moved from the cam 28, the clutch surfaces 22a and 23a are engaged so that the shaft 20 is rotated with the continuously rotating gear 23.

As the carrier C rotates over the washing fluid tank 40, the valve member 7 moves into registry with the washing fluid outlet port 65 of the fixed valve member 5, delivering washing fluid to the exterior and interior of the rotating barrel and creating a suction which exhausts fluid from the fluid collecting pocket 74.

Before the compartment 17 is moved beyond the tank 40, the inlet port 49 moves out of registry with the outlet port 65 and the air inlet port 50 of the valve member 7 moves into registry with the air outlet port 68 of the valve member 5, delivering air to the interior of the barrel which air also creates a suction exhausting any fluid remaining in the pocket 74. As the delivery of a fluid is always accompanied by an exhausting of that fluid, when the delivery of a fluid to a barrel is stopped but a small quantity of fluid remains in the pocket to be exhausted by the air.

As the carrier C carries the compartment 17 over the rinsing fluid tank 41, the inlet port 49 successively comes into registry with the rinsing fluid outlet port 66 and the fresh water outlet port 67 so that the exterior and interior of the barrel are simultaneously thoroughly washed.

After the compartment 17 moves from over the rinsing fluid tank 41, the air inlet port 50 registers with the air outlet port 69 delivering air to the barrel to thoroughly dry its interior before it rotates to adjacent the door D where its rotation ceases.

It will be understood that the carrier C is stopped and started for the removal of a cleansed barrel and its replacement by a barrel to be cleaned as each compartment moves adjacent the door D. This may be done by manually or automatically stopping the motor 34, the barrels in the other compartments continuing to rotate with their V-shaped supports 21 and being in a more or less advanced stage of cleanliness.

Figure 4:
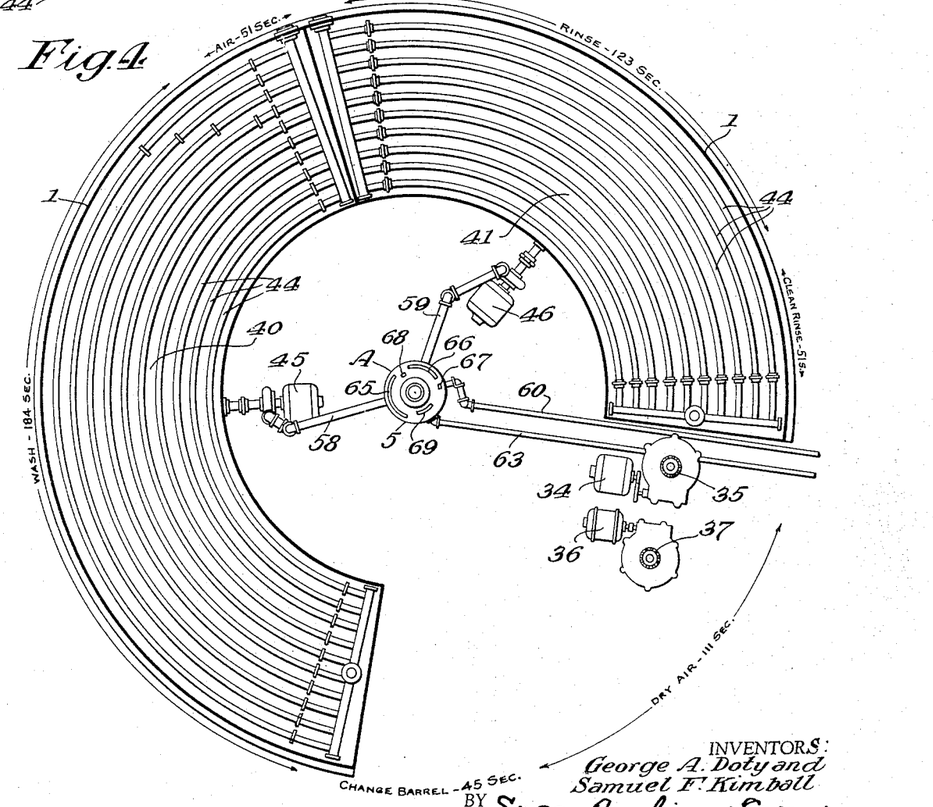
Fig. 4 is a plan view of the fluid delivery system.

In Fig. 4 we have indicated a satisfactory cycle of operation. This cycle is predicated on one barrel being removed from and another placed in a V-shaped support in forty-five seconds. While passing over the washing fluid tank, the barrel to be cleaned is subjected to cleansing fluid for one hundred and eighty-four seconds and to air for fifty-one seconds. While passing over the rinsing fluid tank, the barrel is subjected to rinsing fluid for one hundred and twenty-three seconds and to a fresh water rinse for fifty-one seconds. The barrel is then thoroughly dried by the injection of air for one hundred and eleven seconds.

In accordance with our invention, the exteriors and interiors are thoroughly washed and rinsed simultaneously and the interiors thoroughly dried so that the cleansing of the barrels may be effected with economy and efficiency.

What we therefore claim and desire to secure by Letters Patent is:

1. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a fluid delivery and exhaust spindle adapted to be inserted into said barrel through its bunghole downwardly into said pocket.

2. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a fluid delivery spindle adapted to be inserted into said barrel through its bunghole and including an exhaust portion adapted to enter said pocket.

3. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a fluid delivery and exhaust spindle adapted to be inserted into said barrel through its bunghole downwardly into said pocket and means to detachably hold said spindle in alignment with the axis of rotation of said support.

4. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a fluid delivery spindle adapted to be inserted into said barrel through its bunghole and including an exhaust portion, means to detachably lock said spindle in alignment with the axis of rotation of said support, said spindle having a zone of vertical movement relative to said locking means so that the end of said exhaust portion may position itself in pockets lying in different horizontal zones.

5. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a fluid delivery and exhaust spindle adapted to be inserted into said barrel through its bunghole downwardly into said pocket, means to detachably hold said spindle in alignment with the axis of rotation of said support, a conduit communicating with said delivery spindle and including a flexible portion whereby when said spindle is detached from said holding means said barrel and spindle may be removed from said support and said spindle withdrawn from said barrel without disconnecting said conduit from said spindle.

6. In apparatus for reconditioning the interiors of barrels, means to rotatably support a barrel in such a canted position that its lowermost part establishes an internal fluid collecting pocket defining with the bunghole the axis of rotation of said barrel, said means comprising a rotatable support to engageably receive said lowermost part and a spindle adapted to be inserted into said barrel through its bunghole, said spindle comprising a fluid delivery portion and an exhaust portion extending into said pocket, said portions being interconnected so that injections through said delivery portion create a suction in said exhaust.

7. In apparatus as defined in claim 6, the exhaust portion of the spindle having a pocket entering end including a rotatable bearing adapted to bear against the barrel surfaces defining said pocket.

8. In apparatus for reconditioning the interiors of containers, a rotatable support, a spindle adapted to be inserted into a barrel through its bunghole, means adapted to detachably hold said spindle in alignment with the axis of rotation of said support, said support being adapted to receive said barrel in such position that when said barrel is tilted to bring the inserted spindle into position to be held by said holding means, said barrel is engageably received by said rotatable support in canted position with a chime-to-bunghole axis of rotation.

9. In apparatus for reconditioning the interiors of containers, a rotatable support, means for rotating said support and means disengaging said support from said rotating means, a fixed support, a spindle adapted to be inserted into a barrel through its bunghole, means to hold said spindle in alignment with the axis of rotation of said rotatable support, said rotatable support and said fixed support being adapted to receive a barrel in such position that when tilted on said rotatable support to bring the inserted spindle into position to be held by said holding means said rotatable support engageably receives said barrel in canted position with a chime-to-bunghole axis of rotation.

10. In apparatus for reconditioning the interiors of containers a rotatable support, a fixed support, a spindle adapted to be inserted into a barrel through its bunghole, means to hold said spindle in alignment with the axis of rotation of said rotatable support, said rotatable support and said fixed support being adapted to receive a barrel in such position that when said barrel is tilted on said rotatable support to bring the inserted spindle into position to be held by said holding means, said rotatable support engageably receives said barrel in canted position with a chime to bunghole axis of rotation.

11. In apparatus for reconditioning the interiors of barrels, a housing, a fixed support carried by said housing and a rotatable support spaced inwardly of said fixed support and within said housing, a spindle adapted to be inserted into a barrel through its bunghole, said supports being adapted to receive a barrel in such position that its bunghole is available for the manual insertion of said spindle, said rotatable support engageably receiving said barrel in canted position with a chime-to-bunghole axis of rotation when said barrel is tilted thereon to bring the inserted spindle into alignment with the axis of rotation of said support.

12. In apparatus for a reconditioning the interiors of barrels, a housing, a fixed support carried by said housing and a rotatable support spaced inwardly of said fixed support and within said housing, a spindle adapted to be inserted into a barrel through its bunghole, said supports being adapted to receive a barrel in such position that its bunghole is available for the manual insertion of said spindle, said rotatable support engageably receiving said barrel in canted position with a chime-to-bunghole axis of rotation when said barrel is tilted thereon to bring the inserted spindle into alignment with the axis of rotation of said support, and means for holding said spindle in alignment with the axis of rotation of said rotatable support.

13. In apparatus for reconditioning the interiors of barrels, a housing, a fixed support carried by said housing, a rotatable support inwardly of said fixed support and within said housing, a spindle adapted to be inserted into a barrel through its bunghole, said supports being adapted to receive a barrel in such position that its bunghole is available for the manual insertion of said spindle, said rotatable support engageably receiving said barrel in canted position with a chime-to-bunghole axis of rotation when said barrel is tilted thereon to bring the inserted spindle into alignment with the axis of rotation of said support, said spindle including a flanged head, a track supported in said housing to guide said head and spindle inwardly or outwardly as said barrel is tilted into and out of said canted position, and means associated with said track for detachably holding said head in alignment with the axis of rotation of said support.

14. In apparatus for reconditioning the interiors of barrels, a housing, a fixed support carried by said housing and a rotatable support inwardly of said fixed support and within said housing, a spindle adapted to be inserted into a barrel through its bunghole, said supports being adapted to receive a barrel in such position that its bunghole is available for the manual insertion of said spindle, said rotatable support engageably receiving said barrel in canted position with a chime-to-bunghole axis of rotation when said barrel is tilted thereon to bring the inserted spindle into alignment with the axis of rotation of said support, said spindle having a recess therein, a flanged pin member adapted to enter said recess, a track supported in said housing to guide said pin member inwardly or outwardly when said inserted spindle is engaged by said pin and said barrel is tilted into and out of canted position, said track being shaped substantially as an arc having said rotatable support as its centre whereby said pin and said spindle remain in engagement as said barrel is tilted.

15. In apparatus as defined in claim 14, means associated with said track for holding said flanged pin in alignment with the axis of rotation of said support.

16. In apparatus as defined in claim 14, means associated with said track for holding said flanged pin in alignment with the axis of rotation of said support and means for releasing said holding means.

17. In apparatus for simultaneously reconditioning the interiors and exteriors of barrels, means for rotatably supporting a barrel in canted position to establish a bunghole-to-chime axis of rotation with the lowest portion of said barrel positioned in said support, an interior fluid delivery and exhaust spindle disposable through said bunghole in said axis of rotation and adapted to deliver fluid to all inside surfaces of the barrel as said barrel rotates, and external spray means disposed about said barrel support in a plane inclusive of its said axis of rotation and outside of the zone of rotation of said support and barrel and adapted to deliver fluid to all outside surfaces of the barrel as it rotates, and common fluid supply connections for said spindle and said spray means.

18. In apparatus for simultaneously reconditioning the interiors and exteriors of barrels, means to rotatably support a barrel in such a canted position that its lowest part establishes an internal fluid collecting pocket defining with the bunghole the axis of rotation of said barrel, said means comprising a rotatable support to engageably receive said lowest part, and a delivery spindle adapted to be inserted into said barrel through its bunghole, said spindle including an exhaust portion adapted to extend into said pocket, means to detachably hold said spindle in alignment with the axis of rotation of said support, and spray members disposed to direct fluids against all surfaces of the exterior of said barrel as it rotates, fluid supply means communicating with said delivery spindle and said spray members, and air supply means communicating with said delivery spindle, and a valve control for said sources.

19. In apparatus for simultaneously reconditioning the interiors and exteriors of barrels, a base, a barrel carrier rotatably mounted on said base, means on said carrier to rotatably support a barrel so positioned that its lowermost part defines with the bunghole the axis of rotation of said barrel, said means comprising a rotatable support to engageably receive said lowermost part, and a delivery spindle adapted to be inserted into said barrel through its bunghole to deliver fluids to all interior surfaces of said barrel as it rotates, means to detachably hold said spindle in alignment with the axis of rotation of said support and spray members disposed to direct fluids against all surfaces of the exterior of said barrel as it rotates, washing fluid supply means, rinsing fluid supply means, a fresh water supply means, and an air supply means, a valve, all of said supply means being in communication with said valve, a fluid conduit from said valve to said spindle and spray members and an air conduit from said valve to said spindle, said valve being adapted to deliver said fluids and air to said spindle in predetermined order as said carrier rotates, means for rotating said carrier and separate means for rotating said barrel support, and means for stopping rotation thereof in a predetermined zone to permit the insertion and removal of barrels from said supports.

20. In apparatus for cleansing the interior of barrels, means to support a barrel, having a bunghole, in a canted position to establish a liquid collection pocket in a lower corner of the barrel below the bunghole, and elongated liquid supply and exhaust means insertable downwardly through the bunghole to an operative position within the barrel in which its lower end is disposed in said pocket and an upper portion thereof is disposed in the bunghole and effective, when inserted to said position, to spray liquid laterally against the interior surfaces of the barrel substantially throughout the height thereof and to exhaust liquid from said pocket, and means for rotating one of said first named means relative to the other about an axis passing through the lower end portion of said second mentioned means and through the portion thereof which is disposed in the bunghole, thereby to assure a thorough spraying of the interior surfaces of the barrel by the supplied liquid.

21. In apparatus for cleansing the interiors of barrels, means to support a barrel, having a bunghole, in a canted position to establish a liquid collection pocket in a lower corner of the barrel below the bunghole, and elongated liquid supply and exhaust means insertable downwardly through the bunghole to an operative position within the barrel in which its lower end is disposed in said pocket and an upper portion thereof is disposed in the bunghole and effective, when inserted to said position, to spray liquid laterally against the interior surfaces of the barrel substantially throughout the height thereof and to exhaust liquid from said pocket, and means for rotating said support and the barrel relative to the liquid supply and exhaust means about an axis passing through the lower end portion of said second mentioned means and through the portion thereof which is disposed in the bunghole, thereby to assure a thorough spraying of the interior surfaces of the barrel by the supplied liquid.

22. A unitary device for supplying washing liquid to and for exhausting washing liquid from a container of the type having a relatively small access opening above the bottom thereof, said device comprising a head having liquid inlet and outlet chambers, means for the flow of liquid from said inlet chamber through said outlet chamber to produce a suction action in said outlet chamber, a rigid, elongated, liquid delivery tube carried by said head and in communication with said liquid inlet chamber, a liquid exhaust tube carried by said head and in communication with said liquid outlet chamber and of smaller diameter than said inlet tube and extending through said inlet tube, said tubes extending downwardly from said head and the lower end of the liquid outlet tube being open for the entrance into the same of the liquid to be exhausted, the inlet tube being of sufficiently small diameter to enable the same to be inserted through the container opening and said tubes being of sufficient length so that when the inlet tube is inserted through said opening to an operative position within the container the lower, open end of the exhaust tube is disposed in a lowermost portion of the container and the head is disposed above the container access opening, that portion of the inlet tube which is disposed within the container when the lower end of the exhaust tube is in a lowermost portion of the container having a series of liquid discharge openings therein spaced therealong.

23. In a device as set forth in claim 22, a rotatable bearing member on the lower end of one of the tubes for contact with the container to position the lower end portion of the device relative to the container and to permit free relative rotation between the container and the device about an axis passing through said bearing member and the portion of the device which is disposed in the access opening in the container when the device is operatively positioned relative to the container.

24. In a device as set forth in claim 22, a rotatable bearing member on the lower end of one of the tubes for contact with the container to position the lower end portion of the device relative to the container and to permit free relative rotation between the container and the device about an axis passing through said bearing member and the portion of the device which is disposed in the access opening in the container when the device is operatively positioned relative to the container, and a downwardly flaring guard element carried by one of said tubes in overlying relationship to said bearing member to guide the latter through the access opening in the container when the device is withdrawn from the container.

GEORGE A. DOTY.
SAMUEL F. KIMBALL.